Figure 3A:
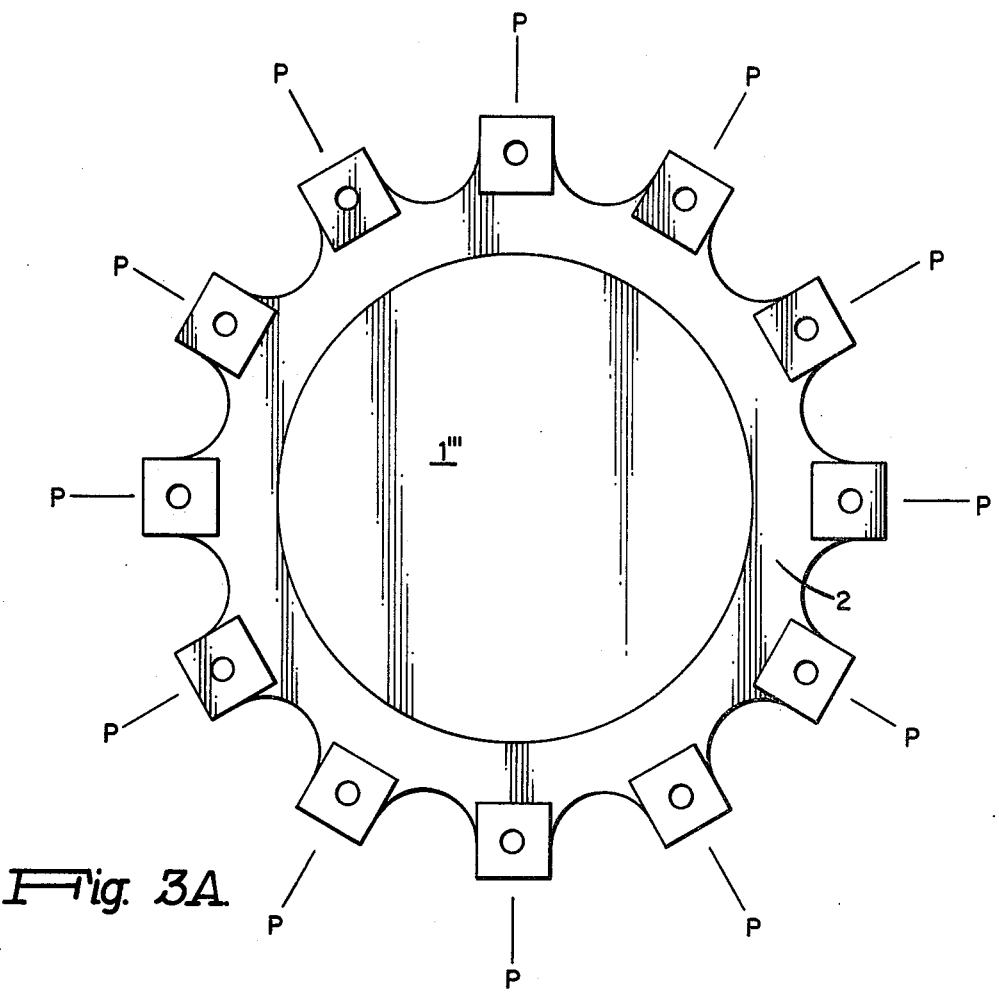

United States Patent [19]

Borsare et al.

[11] 4,155,631
[45] May 22, 1979

[54] APPARATUS FOR COMPENSATING FOR THERMALLY INTRODUCED DISTORTIONS IN REFLECTING SURFACES

[75] Inventors: Edward C. Borsare, Westwood; Edward V. Locke, Rockport, both of Mass.

[73] Assignee: W. J. Schafer Associates, Inc., Wakefield, Mass.

[21] Appl. No.: 787,330

[22] Filed: Apr. 14, 1977

[51] Int. Cl.² ........................... G02B 7/18; G02B 5/08
[52] U.S. Cl. .................................................. 350/310
[58] Field of Search ................... 350/310, 320, 295, 6

[56] References Cited

U.S. PATENT DOCUMENTS

| | | | |
|---|---|---|---|
| 1,530,441 | 3/1925 | Thomson | 350/310 |
| 3,555,450 | 1/1971 | Rockwell | 350/310 |
| 3,731,992 | 5/1973 | Mansell | 350/310 |
| 3,781,095 | 12/1973 | Rushing et al. | 350/310 |

Primary Examiner—Jon W. Henry
Attorney, Agent, or Firm—Rines and Rines, Shapiro and Shapiro

[57] ABSTRACT

The invention is concerned with novel pre-stressing of a reflecting surface such as a mirror, that is to be irradiated by a high energy laser beam or similar source, in such a manner that the beam-induced heating of the reflective surface causes a relaxation of the pre-stress that is designed to produce a surface distortion substantially equal and opposite to that caused by the heating.

23 Claims, 8 Drawing Figures

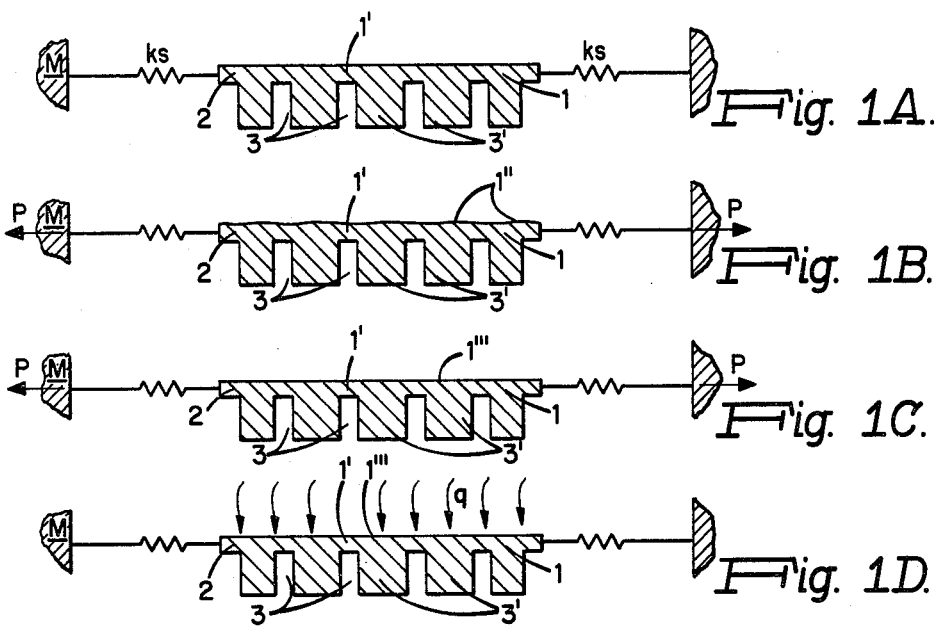
Fig. 1A.
Fig. 1B.
Fig. 1C.
Fig. 1D.
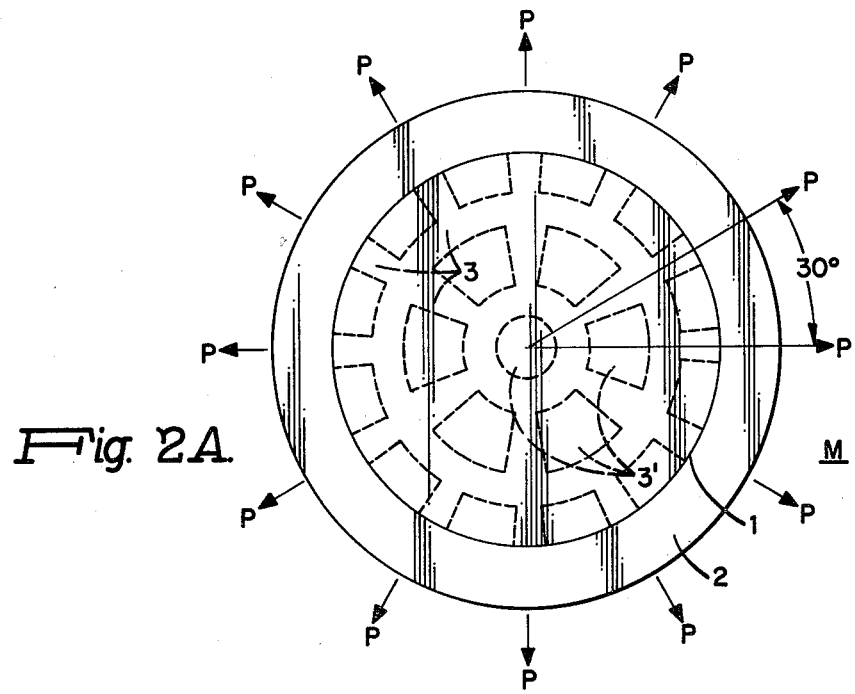
Fig. 2A.
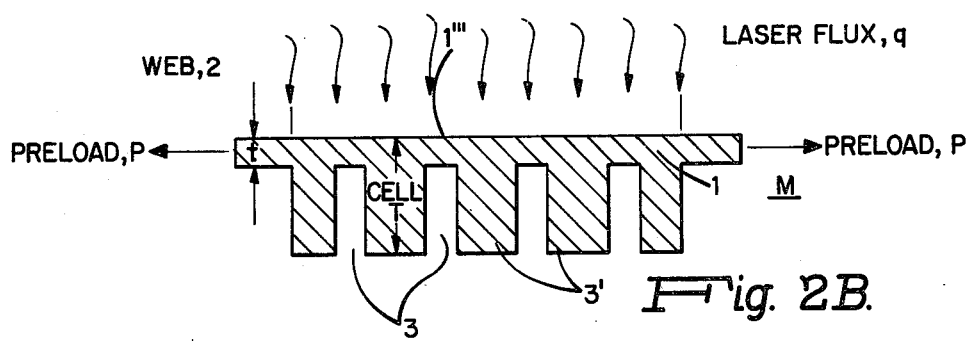
Fig. 2B.

APPARATUS FOR COMPENSATING FOR THERMALLY INTRODUCED DISTORTIONS IN REFLECTING SURFACES

The present invention relates to methods of and apparatus for compensating for thermalling introduced distortions in laser-beam and related reflecting surfaces, being more particularly directed to effecting such compensation during the period of irradiating the reflecting surface of the mirror by the beam energy. The term "mirror" as herein used, moreover, is intended generically to embrace radiation relfecting or directing surfaces.

Considering first the high energy laser field in which the present invention has a primary though not exclusive application, mirrors that have been designed and used fall into two general classes: (1) cooled mirrors; and (2) heat sink, uncooled mirrors. Cooled mirrors typically involve high-pressure water flowing past a thin reflecting skin attached to a stiff backplate, such as the systems described, for example, in U.S. Pat. Nos. 3,781,094, 3,854,800, 3,923,383, 3,926,510, 3,986,768, and 4,003,641. They are used in CW lasers or in repetitively pulsed lasers operating for extended periods (e.g., several minutes). The temperature rise of the cooled reflecting surface is kept sufficiently small by high-pressure high-flow water coolant to insure that the resulting distortion is within acceptable limits. This design concept, however, results in rather complicated and expensive mechanical structures, and is attended by the vast cooling requirements and resulting cumbersome and heavy optical subsystem modules.

Heat-sink, uncooled mirrors, on the other hand, such as the AVCO "Thumper" laser system with copper heat-sink mirrors, are used for single pulse or repetitively pulsed lasers and with CW lasers operating for short periods (e.g. several seconds). They operate upon the principle that they provide sufficient mass to absorb the thermal energy deposited during the period of operation, and thus maintain the temperature rise occasioned by the incident laser beam within acceptable limits. Heat-sink mirrors are normally designed to result in surface distortions that are considered acceptable, and no attempt is made actually to compenstate for such distortions during the period of operation of the laser. This generally results in mirrors that are relatively large and heavy.

This is in decided contrast to the pre-stressed membrane mirror concept of the present invention, which, to the contrary, actually compensates for distortions during laser operation, enabling the mirror structure to be smaller and lighter than conventional heat-sink mirrors; and it is to this approach of improvement through self-compensation that the invention, in its broadest aspects, is directed.

Other approaches to the cooling problem have involved the use of phase-change materials in substantially heat-pipe systems, as represented, for example, by U.S. Pat. No. 3,582,190. Other membrane and similar mirrors are disclosed in U.S. Pat. Nos. 3,719,900, 3,880,500, 3,936,159, 3,416,089 and 3,660,776 Avoidance of cracking, as distinguished from preserving optical properties, together with fluid cooling was proposed quite early in U.S. Pat. No. 1,520,441, holding the reflecting surface in compression. This, of course, is fundamentally different from pre-stress in tension, and involves no control of surface distortion, let alone the relaxation of tension during irradiated use to effect the surface distortion compensation that can control optical performance.

It should be noted, moreover, that the whole history of the optical art has led designers to render optical surfaces as stress-free as possible; whereas the present invention embodies the contrary and unobvious approach of deliberately introducing stress and causing thermal effects in use to relax the stress to effect a compensation.

An object of the present invention, accordingly, is to provide a new and improved method of and apparatus for compensating for thermally introduced distortions in laser-beam and related optical surfaces that shall not be subject to the limitations of prior-art approaches, as above summarized, but that shall enable improved optical property control through self-compensatory interaction with and correlation of thermally induced distortions.

A further object is to provide a novel mirror or the like that is pre-stressed in tension such that laser-or other radiation-induced heating of the reflective or other optical surface will cause a relaxation of the pre-stress to a degree substantially to cancel and thus compensate for the surface distortion resulting from the heating, thus keeping the mirror flat, during irradiated use, or otherwise enabling the desired optical properties to be maintained.

Other and further objects will be explained hereinafter and are more particularly delineated in the appended claims. In summary, however, from one of its important aspects, the invention embraces a method of controlling the optical performance of a laser and simlar beam mirror, that comprises, impinging such beam upon the mirror and thereby introducing thermal distortions therein; stressing adjacent regions of the mirror in a predetermined manner to introduce distortions that interact with the said thermal distortions; and adjusting said stressing to produce a predetermined resultant effect from such interaction that controls said optical performance. Preferred details and constructions are hereinafter described.

Figure 3B:
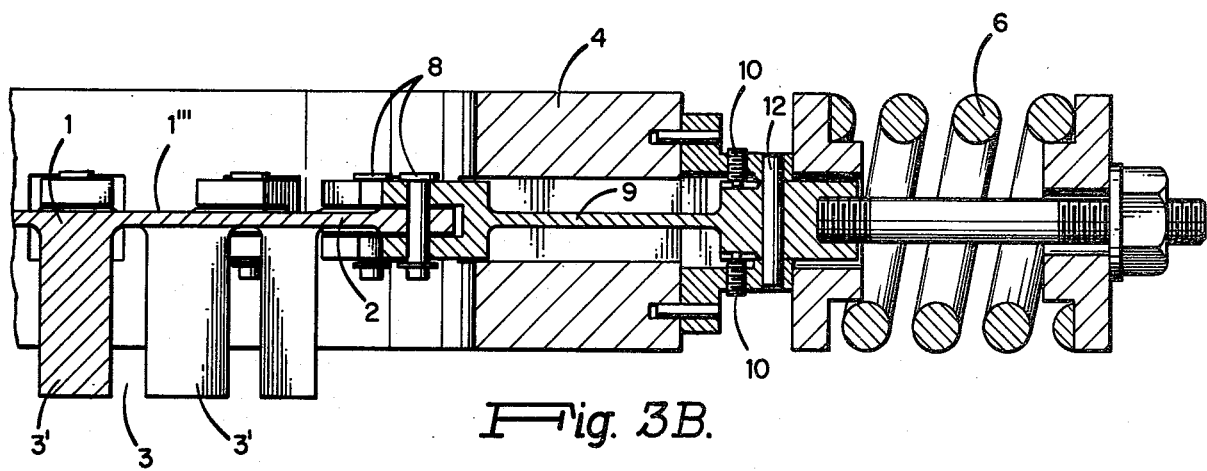

The invention will now be detailed in connection with the accompanying drawings, FIGS. 1A through 1D of which are schematic side elevational views respectively illustrating the assembly, pre-stressing, polishing and thermal loading of a mirror apparatus constructed in accordance with and embodying the method of the invention;

FIGS. 2A and 2B are respectively more detailed top and side elevation views of the mirror apparatus; and FIGS. 3A and 3B are fragmentary top and longitudinal cross-sectional views of a preferred constructional embodiment thereof.

The theoretical considerations underlying the method and apparatus of the invention and its operation are schematically illustrated in FIGS. 1A, B, C and D. In its preferred form, a plate 1 is, for example, rearwardly serrated at 3 to produce a thin face region 1' that serves as an elastic membrane, with all of the stretching occuring therein, and a rearward set of heat-conducting cells 3'. The mirror is assembled in its support mount M, having a radial stiffness schematically shown at $K_s$ between the peripheral web 2 and the mount M. The structure is then outwardly radially tensioned, at preferably uniform regions P, to pre-stress the membrane region 1', causing the surface distortions 1" having nodal regions opposite the serrated regions 3, as illustrated in FIG. 1B, and as later more fully explained. The outer surface of the pre-stressed membrane 1' is then polished flat at 1''' to serve as the optical reflecting surface, FIG. 1C, for the illustrative planar mirror embodiment herein described. When the thermal load is applied by the laser or other high energy radiation, illustrated schematically by the incident or impinging flux q in FIG. 1D, radial growth is induced by the thermally generated distortion which relaxes the pre-stress introduced in FIG. 1B. The thermal gradients cause bending and out-of-plane growth distortions in 1' which are in the opposite direction to the distortions caused by pre-stress relaxation. By choosing the appropriate support stiffness $K_s$, the relaxation of the pre-stress will continually tend substantially to cancel out the thermally induced distortions during the period of operation.

In determining the required geometry and pre-stress conditions, studies were carried out in connection with the membrane mirror, using finite element techniques. The mirror geometry was optimized to minimize effects of thermal gradients due to both uniform and non-uniform beam intensities. The mirror support frame was designed to give maximum optical performance of the mirror surface 1''', while holding stresses within allowable limits. The analysis included the determination of temperature gradients and the resulting stresses and distortions in the optimized mirror assembly; the interaction of the mirror surface 1''' with the pre-stressing support frame M-P; and the prediction of optical performance of the distorted mirror surface. For the uniform flux distribution case, optical surface distortions as low as $\lambda/100$ rms ($\lambda = 10.6$ $\mu$m) were considered during 10 seconds of operation; and for the non-uniform cases, the distortions indicated were of the order of about $\lambda/16$.

For actual tests with, for example, 20 KW $CO_2$ laser beams, molybdenum was selected as the most suitable and thus preferred material for the mirror structure. The initial mirror geometry and configuration was that of FIGS. 2A and B with a circular mirror diameter of 13.0 cm., a clear aperture of 10.0 cm., a thickness T of each cell 3' of 2.56 cm., (shown vertical in FIG. 2B), and a thickness (or thinness) t of the web 2 of 0.64 cm. The center cell 3' (circular) has a radius of 0.8 cm. and was radially spaced 0.8 cm. from the inner ring of six symmetrically disposed cells 3', each of 1.6 cm. radial extent. The cells 3' of this inner ring of cells were spaced 0.8 cm. from the outer concentric ring of cells, each of about 1.0 cm. in radial extent, and with the web 2 radially extending a further 1.5 cm..

Studies were made with a uniform heat flux of 20 watts/cm$^2$ normal to the surface 1''' over the clear aperture of the mirror; this value having been selected since it represents the absorbed flux due to an incident impinging flux of 20 KW/cm$^2$ for a mirror with a coating absorptivity of 0.001, values typically used in the design of said prior art high performance water-cooled mirrors. Typical plots of the temperature gradient through the cells 3' as a function of time demonstrate that the gradient increases sharply for the first 3 or 4 seconds and then levels off to a nearly constant value for the remaining time interval as more fully explained in an interim report of the assignee of this patent application prepared for limited military distribution by the Defence Advanced Research Projects Agency and the U.S. Army Missile Command, Redstone Arsenal, on Apr. 14, 1976, and entitled "Engineering Design Study of Pre-stressed Membrane Mirror For HEL applications".

The curve of deflection of the mirror surface over the clear aperture as a function of time shows that the deflection becomes constant with increasing time, which is due to the fact that once the heat reaches the bottom surface, the top and bottom heat up at the same rate; i.e., the gradient through the mirror structure becomes constant with time. Optimization of the depth or (vertical) thickness of the cells 3' for a maximum surface temperature due to uniform heat flux of 100° C., was determined to be about 3.50 cm.; with the increase of the cell depth from the first-mentioned 2.56 cm. to 3.50 cm. causing about a 4° C. decrease in surface temperature at the center of the mirror, but increased further depth dimensions only resulting in more modest decreases that did not justify the added cost and weight penalties of greater depths.

Turning to thickness or thinness optimization of the peripheral web 2, it is desirable to attain as thin a dimension as practicable in order to approach the characteristics of a membrane; i.e., to resist in-plane forces, but not bending. The limiting effects for a thinner web are an increase in surface temperature for thermal loading and an increase in web stress due to in-plane loading. An 0.20 cm. thickness was selected as a preferred value, such a structure exhibiting a rapidly increasing rate of temperature rise. It was found that the web stresses for a constant in-plane loading varied inversely with thickness, such that the web stress remained nearly constant. For an initial preload of 400 Kg (corresponding to the 0.20 cm. web thickness), the maximum web stress was approximately 2100 Kg/cm$^2$. Since the allowable micro-yield stress of molybdenum is 3500 Kg/cm$^2$, this allows a reasonable margin for stress concentrations and potentially higher preloads.

Residual deflections due to the cancellation of thermal distortions by the relaxation of the pre-stress, for both fixed and simply supported (or pinned) edges, were found to be substantially the same, yielding approximately the same RMS error. The fixed end condition, however, is deemed preferable because of the smaller deflection there-involved.

In order to achieve self-compression and to prevent the mirror from going into compression and buckling, morover, the support frame M must be designed to provide an effective stiffness that is a function of the mirror stiffness and the surface deformations caused by thermal gradients and pre-stressing. A preferred and optimum spring constant for the above illustrative system was determined to be substantially $1.85 \times 10^5$ Kg/cm..

For maximum optical performance, the RMS surface error should, of course, be minimized. Without refocusing (and thus representing maximum errors), it was determined that the RMS surface error sharply increases for the first few seconds of operation and then decreases over the following few seconds of heating time. This may be explained by virtue of the almost immediate "pop up" of the mirror surface caused by initial thermal gradients, and then the increase at a much slower rate. Thereafter, the compensating deflection caused by pre-stress relaxation is much more linear in behavior and does not completely cancel out the thermal deflection in the above example until about 7 seconds of heating time has elapsed. After 7 seconds of operation, the deflection due to pre-stress relaxation becomes greater than the thermal deflection.

A practical embodiment of a mirror designed to include the features above-described and operating in accordance with the method underlying the invention, is shown in FIGS. 3A and B, being machined, for example, to provide the configuration of FIGS. 2A and B. All major elements of the assembly are constructed of the same material, (molybdenum, for example) to eliminate the possibility of changes in pre-stress, and therefore surface distortion, caused by base temperature changes.

The mirror surface is supported by twelve equally angularly spaced arms through which the pre-stress (P) is introduced. The arms 8 are shown sized such that they provide the required spring constant $K_s$ and are connected by shear pin junctions 8 with the web periphery. An outer support ring 4 through which the arm extensions pass (FIG. 3B) provides the necessary rigidity for resisting the pre-stress loads. The pre-load (P) is applied to each arm at equal circumferential points through a 2500 lb./in. spring element 6, applying tension through the arm extensions. Adjustments to the mirror surface can be made by set screws 10. When the mirror is suitably adjusted and the desired pre-load is reached (as measured on strain gauges, not shown), each arm is pinned by inserting dowel pins 12 in drilled holes beyond the set screws block. The springs 6 may then be removed since the dowel pins 12 hold the pre-load fixed. The mirror is then ready for final polishing as schematically represented in FIG. 1C. The mirror of FIG. 3A and B, after pre-stress, was found to produce a center deflection as a function of pre-load that was in close agreement with the analytical prediction of $40 \times 10^{-6}$ inch per 100 lbs of pre-load in each arm.

While the invention has been described with reference to the problem of keeping a mirror optically flat, for example, the geometry of the pre-stressed membrane mirror allows the application of self-reacting forces betweeen adjacent cells 3' to produce deliberate surface distortions that may modify incident wavefront and intensity distributions for special purposes. These stresses may also be introduced during operation as distinguished from, or in addition to, pre-stressing. This technique can thus be used to produce any number of desired intensity patterns in the far field, such as a focused spot, a uniform annulus, a rectangular distribution, or a more uniform, collimated laser beam, useful in such commercial applications as welding and heat-treating with high-energy lasers. For this application, moreover, the mirror figure can be monitored by a sensor, not shown, and suitable corrections can be made by the self-reacting forces to compensate for thermally induced distortions. All of the embodiments of the invention may also use cooling systems, if desired, with the serrated or otherwise formed cells also serving as heat sink radiators.

Other modifications will also occur to those skilled in this art, and such are considered to fall within the spirit and scope of the invention as defined in the appended claims.

What is claimed is:

1. A self-reacting, optical-controlling mirror apparatus comprising in combination, a mirror including a circular membrane with a surface upon which high energy laser and related beams may be impinged, whereby such beams introduce thermally generated distortions in the mirror, said membrane being backed by spaced cells and having radially extending tensioning arms; and stressing means connected with said tensioning arms for applying tension thereto tending to expand said surface, thereby stressing adjacent regions of the mirror to introduce distortions that may interact with said thermally generated distortions; said stressing means being adjusted to produce distortions substantially equal and opposite to the said thermally generated distortions, thereby substantially to compensate for the same to control the optical performance of said mirror apparatus.

2. Apparatus as claimed in claim 1 and in which said tensioning arms are disposed at substantially equal angular spaced points along the circumference of said membrane.

3. Apparatus as claimed in claim 2 and in which said cells backing the membrane are disposed in concentric rings.

4. Apparatus as claimed in claim 3 and in which said tensioning arms are carried by an outer supporting ring exposing the membrane mirror surface.

5. Apparatus as claimed in claim 2 and in which said mirror is constructed of molybdenum.

6. Apparatus as claimed in claim 5 and in which the number of said equal angular spaced points is twelve.

7. Apparatus as claimed in claim 5 and in which the thickness of the membrane is substantially 0.20 cm. and the depth of the cells is substantially 3.5 cm.

8. Apparatus as claimed in claim 5 and in which the stressing means applies a load of the order of 400 Kg, producing a resulting maximum stress of the order of 2100 Kg/cm$^2$.

9. Apparatus as claimed in claim 5 and in which the mirror includes a resilient supporting structure with a spring constant of substantially $1.85 \times 10^5$ Kg/cm.

10. Apparatus comprising, in combination, a self-reacting, optical-controlling mirror having a mirror surface, laser means for impinging a high energy beam upon said surface and thereby introducing thermally generated distortions in the surface, and tension means connected with said surface for stressing regions of the mirror and introducing distortions that counteract thermally generated distortions, thereby to control the optical performance of said mirror.

11. Apparatus as claimed in claim 10 and in which said tension means produces distortions substantially equal and opposite to the said thermally generated distortions, thereby substantially to compensate for the same.

12. Apparatus as claimed in claim 11 and in which said tension means comprises means for pre-stressing the mirror surface before impingement of said beam such that said thermally generated distortions relax the pre-stress to effect the compensation.

13. Apparatus as claimed in claim 10 and in which the mirror comprises an elastic membrane having said surface and the stressing means stretches the membrane substantially parallel to the surface.

14. Apparatus comprising, in combination, a self-reacting, optical-controlling mirror having a mirror surface including a membrane backed by spaced cells, means for impinging a high energy beam upon said surface and thereby introducing thermally generated distortions in the surface, and tension means connected with said surface for stressing regions of the mirror and introducing distortions that counteract thermally generated distortions, thereby to control the optical performance of said mirror, said tension means producing distortions substantially equal and opposite to the said thermally generated distortions, thereby substantially to compensate for the same, and comprising means for pre-stressing the mirror surface before impingement of said beam such that said thermally generated distortions relax the pre-stress to effect the compensation.

15. Apparatus as claimed in claim 14 and in which said membrane is circular and is provided with radially extending tensioning arms.

16. Apparatus as claimed in claim 15 and in which said tensioning arms are disposed at substantially equal angular spaced points along the circumference of said membrane.

17. Apparatus as claimed in claim 16 and in which said cells backing the membrane are disposed in concentric rings.

18. Apparatus as claimed in claim 17 and in which said tensioning arms are carried by an outer supporting ring exposing the membrane mirror surface.

19. Apparatus as claimed in claim 16 and in which said mirror is constructed of molybdenum.

20. Apparatus as claimed in claim 19 and in which the number of said equal angular spaced points is twelve.

21. Apparatus as claimed in claim 19 and in which the thickness of the membrane is substantially 0.20 cm. and the depth of the cells is substantially 3.5 cm.

22. Apparatus as claimed in claim 19 and in which the pre-stress is produced by a load of the order of 400 Kg, producing a resulting maximum stress of the order of 2100 Kg/cm$^2$.

23. Apparatus as claimed in claim 19 and in with the mirror has a resilient supporting structure with a spring constant of substantially $1.85 \times 10^5$ Kg/cm.

* * * * *